(12) United States Patent
Liu et al.

(10) Patent No.: US 8,470,925 B2
(45) Date of Patent: Jun. 25, 2013

(54) AQUEOUS EMULSIONS OF SILICONE RESINS

(75) Inventors: Yihan Liu, Midland, MI (US); Jeffrey Rastello, Saginaw, MI (US); Lori Jean Sutton-Poungthana, Saginaw, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/431,179

(22) Filed: Mar. 27, 2012

(65) Prior Publication Data

US 2012/0184660 A1 Jul. 19, 2012

Related U.S. Application Data

(63) Continuation of application No. 12/446,875, filed as application No. PCT/US2007/024286 on Nov. 20, 2007, now Pat. No. 8,168,716.

(60) Provisional application No. 60/861,636, filed on Nov. 29, 2006.

(51) Int. Cl.
*C08L 83/04* (2006.01)

(52) U.S. Cl.
USPC .......................................................... 524/588

(58) Field of Classification Search
USPC .......................................................... 524/588
See application file for complete search history.

(56) References Cited

U.S. PATENT DOCUMENTS

| 4,554,187 A | 11/1985 | Grape et al. |
| 4,582,874 A | 4/1986 | Grape et al. |
| 4,877,654 A | 10/1989 | Wilson |
| 4,940,743 A | 7/1990 | Grape et al. |
| 5,045,231 A | 9/1991 | Braun et al. |
| 5,443,627 A | 8/1995 | Von Au et al. |
| 5,531,812 A | 7/1996 | Montigny et al. |
| 5,985,994 A | 11/1999 | Oberneder et al. |
| 6,262,171 B1 | 7/2001 | Mayer et al. |
| 6,294,608 B1 | 9/2001 | Hager et al. |

FOREIGN PATENT DOCUMENTS

| CA | 2249552 | 4/1999 |
| CA | 2171168 | 12/1999 |
| EP | 0907622 | 8/2000 |
| JP | 11130962 | 5/1999 |

*Primary Examiner* — Kuo-Liang Peng
(74) *Attorney, Agent, or Firm* — Alan Zombeck

(57) ABSTRACT

Aqueous emulsions of a silicone resin are disclosed that provide a solid silicone resineous coating upon removing water from a film of the emulsion. The silicone resin emulsions are useful for treating various substrates for imparting water resistance/repellence and improving wear/weather protective properties. In particular, they are useful for rendering mineral-based building materials water-resistant, and also as binders in paints.

8 Claims, No Drawings

AQUEOUS EMULSIONS OF SILICONE RESINS

CROSS REFERENCE TO RELATED APPLICATIONS

This is a continuation of U.S. application Ser. No. 12/446,875, filed Apr. 23, 2009, now U.S. Pat. No. 8,168,716 which was a national stage filing under 35 U.S.C. §371 of PCT Application No. PCT/US07/24286 filed on Nov. 20, 2007, which claimed the benefit of U.S. Provisional Patent Application No. U.S. 60/861,636, filed on Nov. 29, 2006 under 35 U.S.C. §119 (e). PCT Application No. PCT/US07/24286 and U.S. Provisional Patent Application No. U.S. 60/861,636 are hereby incorporated by reference.

TECHNICAL FIELD

This invention relates to aqueous emulsions of silicone resins that provide a solid coating upon removing water from a film of the emulsion. The silicone resin emulsions are useful for treating various substrates for imparting water resistance/repellence and improving wear/weather protective properties. In particular, they are useful for rendering mineral-based building materials water-resistant while providing water vapor permeability, and also as binders in paints.

BACKGROUND

Aqueous emulsions of silicone resins are used in a variety of surface treatments such as additives in water based paints and coatings, as well as in treating textile materials. Silicone resins provide protection against wear and weather, increase water resistance or repellence, improve soil resistance, and allow water vapor permeation.

U.S. Pat. No. 4,582,874 discloses an aqueous emulsion of a low molecular weight silicone resin comprising by weight (a) 1-60% of a silicone resin (b) 0.1-10% of an emulsifier, and (c) water.

U.S. Pat. No. 5,443,627 teaches organopolysiloxane-alkyltrialkoxysilane emulsions for impregnating structural fiber-reinforced cement containing: components (A) organopolysiloxane free from basic nitrogen, (B) an alkyltrialkoxysilane, (C) an emulsifier and (D) water.

U.S. Pat. No. 5,531,812 discloses waterproofing agents for mineral building materials based on aqueous emulsions of organo-silanes and/or organosiloxane resins containing reactive groups in which the dispersed phase has an average particle size of 0.55 to 1.1 μm and a scope of particle size range of less than 1.3.

U.S. Pat. No. 6,262,171 discloses an aqueous emulsion comprising the components (A) organosilicone compositions selected from (A1) $C_1$-$C_{20}$-alkyl-$C_2$-$C_6$-alkoxysilanes and (A2) organopolysiloxane containing alkoxy groups, (B) organopolysiloxane containing, one or more siloxane units having SiC-bonded radicals containing basic nitrogen, with the proviso that the amine number of the organopolysiloxane is at least 0.01, and (C) an emulsifier. The said emulsions are used for making porous mineral building materials hydrophobic.

U.S. Pat. No. 6,294,608 discloses aqueous emulsions for imparting water repellency to building materials and wood. The '608 emulsions contain the components(A) organosilicon compounds which are selected from(A1) $C_1$-$C_{20}$-hydrocarbon-$C_1$-$C_6$-alkoxysilanes and (A2) branched organopolysiloxanes containing $C_1$-$C_6$-alkoxy groups,(B) organosilicon compounds which are selected from(B1) $C_1$-$C_6$-alkoxysilanes containing aminoalkyl groups and (B2) branched organosiloxanes containing aminoalkyl groups and (C) an emulsifier. The aqueous emulsions are suitable for imparting water repellency to porous mineral building materials and building coatings and to wood.

U.S. Pat. No. 4,877,654 relates to an aqueous silane emulsion comprising of a silane which is hydrolytically stable within a certain pH range, an emulsifier and a buffering compound providing the certain pH range.

The benefits resulting from using a silicone resin emulsion may be more pronounced if the silicone resin emulsion dries to a coherent resin film having good cohesion within the film and good adhesion to the substrate. Such coherent films may result from a silicone resin emulsion in which the emulsion droplets contain groups or functionality that react with each other and with the substrate upon water removal. This later process is sometimes referred to as "post curing", as opposed to "pre-curing" where the oil phase within the emulsion droplets is crosslinked prior to application and thus becomes non-reactive. However, silicone resin emulsions where the silicone resin contains a substantial quantity of reactive groups, especially hydrolytically reactive groups, poses several challenges. For example, silicone resin emulsions have poor shelf stability due to resin hydrolysis, which often produces an alcohol that destabilizes the emulsion. Another mechanism is resin condensation which results in emulsion breaking or gelling. Even when emulsion remains stable, the silicone resin in the emulsion droplet may slowly react such that with time, it loses some or all of the reactive groups and as a result, the film formed from an aged emulsion has much diminished strength and adhesion or binding ability as compared to that of a freshly prepared emulsion.

Another problem encountered with emulsions containing reactive silicone resins is that the "post curing" does not reach completion after water removal, leaving either a liquid layer on substrate or a film which is tacky or greasy. This problem may be circumvented if the substrate material is such that it promotes post curing in the adhering film, but this will largely limit the choice of the substrate. Alternatively, a catalyst can be incorporated in the emulsion. However the use of a catalyst in the emulsion has the disadvantage that the emulsion needs to be used immediately after preparation, otherwise the oil phase tends to prematurely react thus becomes hardened such that the film resulted from an aged emulsion loses its mechanical strength. Thus, there is a need to identify emulsions of silicone resins that have good storage stability and provide solid, non-tacky coatings upon drying on any surface application, and are free of catalysts.

SUMMARY

This invention relates to an aqueous emulsion comprising;
A) 1-70 weight percent of a silicone resin having an empirical formula

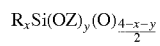

where
R is a monovalent organic group having 1-30 carbon atoms,
Z is hydrogen or an alkyl group having 1-4 carbon atoms,
x has a value from 0.75 to 1.7,
y has a value from 0.1 to 2.0,
and having a viscosity of from 1 to 4000 mPa·s at 25 ° C., B) 0-40 weight percent of a hydroxy terminated polydiorganosiloxane, C) 0.5-20% based on the weight components A) and B) of an emulsifier, D) 0.001-5% based on the weight of the emulsion of a water soluble salt, wherein the emulsion provides a solid coating upon removing water from a film of the emulsion.

The silicone resin emulsions are useful for treating various substrates for imparting water resistance/repellence and improving wear/weather protective properties. In particular, they are useful for rendering mineral-based building materials water-resistant, and also as binders in paints. These silicone resin emulsion are also useful in mold release coatings such as those release coatings for molding polyurethane and rubber articles.

DETAILED DESCRIPTION

A) The Silicone Resin

The emulsions of the present invention contain 1-70 weight percent of a silicone resin having an empirical formula;

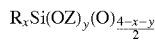

where
R is a monovalent organic group having 1-30 carbon atoms,
Z is hydrogen or an alkyl group having 1-4 carbon atoms,
x has a value from 0.75 to 1.7,
y has a value from 0.1 to 2.0,
and having a viscosity from 1 to 4000 mPa·s.

The silicone resins in the emulsions of the present invention are organopolysiloxanes. Organopolysiloxanes are polymers containing siloxane units independently selected from $(R_3SiO_{0.5})$, $(R_2SiO)$, $(RSiO_{1.5})$, or $(SiO_2)$ siloxy units, commonly referred to as M, D, T, and Q siloxy units respectively, where R may be any organic group containing 1-30 carbon atoms. These siloxy units can be combined in various manners to form cyclic, linear, or branched organopolysiloxane structures. The chemical and physical properties of organopolysiloxane structures can vary, depending on the type and number of siloxy units present in the organopolysiloxane. For example, organopolysiloxanes can be volatile or low viscosity fluids, high viscosity fluids/gums, elastomers or rubbers, and resins.

The organopolysiloxanes useful as silicone resins in the emulsions of the present invention may have any combination of $(R_3SiO_{0.5})$, $(R_2SiO)$, $(RSiO_{1.5})$, or $(SiO_2)$ siloxy units, providing the organopolysiloxane has the empirical formula as described above and a viscosity from 1 to 4000 mPa·s at 25°C.,
alternatively from 10 to 1000 mPa·s at 25°C.,
or alternatively from 50 to 500 mPa·s at 25°C.

In one embodiment, the organopolysiloxane selected as the silicone resin in the emulsions of the present invention contains primarily D and T units. In this embodiment, the D and T siloxy besides having an R substituent on the silicon atom, may also contain a hydroxy or alkoxy substituent, designated as OZ, where Z is hydrogen or an alkyl group having 1-4 carbon atoms. Although not wishing to be bound by any theory, the present inventors believe the presence of these OZ groups in the organopolysiloxane provides reactive sites on the resin to allow it to subsequently form a solid coating upon removal of water from the emulsion. Typically, the amount of OZ groups on the organopolysiloxane present as SiOZ groups is at least 10 weight % of SiOZ groups of the organopolysiloxane, alternatively the weight % of SiOZ groups ranges from 10 to 40 weight percent of the organopolysiloxane. The weight percent of SiOZ in the organopolysiloxane may be routinely determined using $^{29}Si$ NMR spectroscopy.

Alternatively, the silicone resin useful in the emulsion composition of the present invention has the formula:

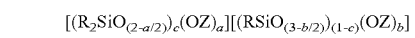

where c and 1-c represent mole fractions of the siloxy units,
a is from 0 to 2,
b is from 0 to 2,
c is from 0 to 0.6,
with the proviso that a+b is from 0.10 to 2.00
R is a monovalent organic group having 1-30 carbon atoms,
Z is hydrogen or an alkyl group having 1-4 carbon atoms.

In this formula $[(R_2SiO_{(2-a/2)})_c(OZ)_a]$ represents D siloxy units and $[RSiO_{(3-b/2)})_{(1-c)}(OZ)_b]$ represents T siloxy units. The mole fractions of the D and T siloxy units present in the silicone resin are indicated by the subscript "c" and "1-c" respectively. The amount of OZ groups on each siloxy unit may vary, as indicated by the subscripts "a" and "b".

Alternatively, the silicone resin useful in the emulsion composition of the present invention may comprise the formula;

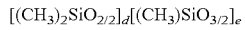

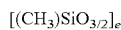

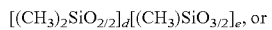

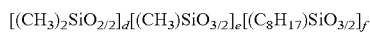

where subscripts d, e, and f are each an integer greater than zero having a value sufficient to provide the silicone resin with a viscosity as defined above;
alternatively d may vary from 0.4 to 1, or alternatively from 0.1 to 0.3,
alternatively e may vary from 0.4 to 1, or alternatively from 0.7 to 0.9,
alternatively f may vary from 0 to 0.1, or alternatively from 0.01 to 0.04.

The silicone resins useful as component A) may be prepared by any known method, but are typically prepared by the ring-opening reaction of a cyclic siloxane followed by hydrolytic polycondensation with alkoxysilane(s) or by the hydrolytic polycondensation of alkoxysilanes. In both procedures, the ring-opening, hydrolysis and condensation reactions can be either acid or base catalyzed. These reactions are then followed by catalyst neutralization, distillative removal of by-product alcohol, filtration and removal of solvent to provide the desired product.

For example, an alkylfunctional silicone resin can be manufactured by preparing a mixture of 50-90 wt % of alkyltrialkoxysilane, dialkyldialkoxysilane and/or cyclic siloxanes, dissolving the mixture in up to 50 wt % of a polar solvent. Typically, the polar solvent can be, but is not limited to, methanol, ethanol, propanol, isopropanol and/or butanol. This mixture is then reacted with deionized water (1-20 wt %) using a suitable acid catalyst. Examples include, but are not limited to, 0.05 wt % trifluoromethanesulfonic acid (TFMSA) or hydrochloric acid. The reaction is then followed by catalyst neutralization, distillative removal of the by-product alcohol. The mixture is then filtered and heated to remove solvent to yield the desired alkylfunctional resin. Typically the alkyl group is comprised of C1-C4, the typical alkoxy group is hydroxyl, methoxy, ethoxy and/or isopropoxy.

Alternatively, silicone resins can be manufactured by preparing a mixture of 50-90 wt % of alkyltrialkoxysilane, dialkyldialkoxysilane and/or cyclic siloxanes, dissolving the mixture in up to 50 wt % of a polar solvent. Typically, the polar solvent can be, but is not limited to, methanol, ethanol, propanol, isopropanol and/or butanol. This mixture is then hydrolyzed with 1-20 wt % deionized water using a catalytic amount of aqueous potassium hydroxide (or another suitable base catalyst known to those skilled in the art. Examples include, but are not limited to, sodium methylate and potassium silanolate. The reaction is then followed by catalyst(s) neutralization, distillative removal of the by-product alcohol. The catalyst can be neutralized with aqueous HCl (or another suitable acid such as acetic acid). The mixture is then filtered and solvent removed to yield the desired alkylfunctional silicone resin. Typically the alkyl group is comprised of C1-C4, the alkoxy group is hydroxyl, methoxy, ethoxy and/or isopropoxy.

B) The Hydroxy Terminated Polydiorganosiloxane

The emulsions of the present invention contain 0-40 weight percent of a hydroxy terminated polydiorganosiloxane. Thus, component B) is optional, but when present is any polydiorganopolysilxoxane having the general formula;

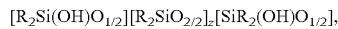

where R is an organic group containing 1 to 30 carbons and z represents the degree of polymerization and is greater than one. Typically, the hydroxy terminated polydiorganopolysiloxane is a hydroxy terminated polydimethylsiloxane having a degree of polymerization (z) from 1 to 1000, alternatively, from 5 to 200, or alternatively from 10 to 100.

C) The Emulsifier

The emulsions of the present invention contain 0.5-20% based on the weight components A) and B) of an emulsifier. While emulsion of the present invention can be prepared by emulsifiers of any type, i.e., anionic, cationic, nonionic and amphoteric, polyvinyl alcohol (PVA) is particularly effective in achieving a film forming system. For example, the components A) and B) can be emulsified by using a nonionic surfactant or a combination of nonionic surfactants having a combined HLB in the range of 10-20, the resultant emulsion, upon water evaporation, leads to a liquid or semi-solidified film on a neutral substrate.

Effective PVA includes those with a degree of polymerization ($P_w$) of 600 to 4000, or a weight average molecular weight $M_w$ of 25,000 to 200,000, and with a degree of hydrolysis (from the acetate) of 70 to 98 mol %, preferably 80 to 95 mol %. The use level of the active PVA ranges from 0.5 to 20%, alternatively from 2 to 10%, based on the total weight of components A) and B).

D) The Water Soluble Salt

The emulsions of the present invention contain 0.001-5% based on the weight of the emulsion of a water soluble salt. The water soluble organic or inorganic salt renders the aqueous phase of the present invention neutral to slightly alkaline at an active level of 0.001 to 5% based on the weight of the emulsion. Examples of water soluble salts that can be used include alkali metal, alkaline earth metal and ammonium salts of carboxylic acids and phosphoric acid. Amines are also effective; examples include alkylamine, diethylamine, triethylamine, ethylene diamine, monoethanolamine, diethanolamine, and triethanolamine. Sodium carbonate or sodium bicarbonate at an active use level of 0.01 to 0.2% based on the weight of the emulsion are particularly effective.

Alternative to alkaline salts, organic or inorganic acid that renders the emulsion slightly acidic can also be incorporated which also results in non-greasy, tack-free films upon water removal. However, an alkaline pH of 7-11 is preferred. More aggressive pH in the acidic or basic ranges is possible so long as it does not adversely affect the stability of the emulsion or the resin.

Process

The sequence of combining components A), B), C), D) and water or part of the water is not critical. The mixture of the components is then subjected to high shear, in devices such as a rotor stator mixer, a homogenizer, a sonolator, a microfluidizer, a colloid mill, mixing vessels equipped with high speed spinning or with blades imparting high shear, or sonication. The water soluble salt (d) rendering the final aqueous emulsion neutral to slightly alkaline, or acid, can be added either with the water phase prior to high shear, or alternatively, added to the emulsion after it being high sheared. The later procedure provides the emulsion with better stability.

Other additives can also be incorporated in the emulsion, such as fillers, foam control agents; anti-freeze agents and biocides.

In an alternative embodiment of the present invention, the silicone resin emulsions are free of alkoxysilanes. As used herein, "free of alkoxysilanes" means that alkoxysilanes are not added as an emulsion component. Alkoxysilanes may be represented by the general formula; $R^3_a Si(OR^4)_{4-a}$, where the subscript a is 1, 2 or 3 and $R^3$ is independently selected from an organic group containing 1 to 30 carbons, and $R^4$ is an alkyl or carbonyl group containing one to 16 carbons. Such alkoxysilanes are also known in the art as organofunctional silanes. Alkoxysilanes are commonly added to aqueous emulsions of silicone resins to further react with the silicone resin and substrate. The silicone resin emulsions of the present invention provide solid coatings upon water evaporation from a film of the emulsion. Thus, in this embodiment, the emulsions may be considered as being "free of alkoxysilanes", and consequentially do not require the addition of alkoxysilanes to form a solid coating.

The present invention further provides a method for preparing a solid coating on a surface comprising;

I) forming a film of the silicone resin emulsion compositions of the present invention on a surface, II) removing water from the film to form a solid coating.

The silicone resin emulsions of the present invention characteristically provide a solid silicone resin upon removing water from a film of the emulsion. Films of the emulsion may be formed by simply laying a thin layer of less than a few millimeter of the emulsion onto a substrate and removing the water from the film by allowing the film to dry at ambient conditions. Alternatively, the films may be heated or dried under ventilation to accelerate the water removal process. Alternatively, the emulsions can be applied, such as by brushing, to a solid surface and allowed to dry at ambient conditions. The emulsions will provide a residual solid silicone resin composition or coating. The formation of the solid silicone resin does not depend on the type of surface or require the addition of a catalyst. The emulsion can also be added to an aqueous formulation and applied to substrate.

The silicone resin emulsions of the present invention are useful for treating various substrates for imparting water resistance/repellence and improving wear/weather protective properties. In particular, they are useful for rendering mineral-based building materials water-resistant, and also as binders in paints.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Materials

The silicone resins used in these Examples, labeled A, B, and C, were prepared as described below.

Silicone Resin A

A 6,000 g batch was prepared by mixing 8,262.4 g of methyltrimethoxysilane, 812.8 g of octamethylcyclotetrasiloxane, 404.1 g of n-octyltriethoxysilane, and 333.3 g methanol. The mixture was hydrolyzed using 4.3 g trifluoromethanesulfonic acid (TFMSA) and 1,349.8 g deionized water, while heating the mixture to reflux temperature (68-70° C.) for 10 hours. The catalyst was then neutralized using 16.5 g $CaCO_3$. The alcohol by-product(s) and residual solvent were removed by distillation, and the resulting composition filtered. The final alkylfunctional silicone resin composition was analyzed and contained; 16.0mol % $Me_2SiO_{2/2}$, 84.0 mol % $RSiO_{3/2}$, 17.9 wt % SiOZ confirming a silicone where 1.7 mol % of the R groups are octyl radical and the rest are methyl, Z is hydrogen or methyl, with at least 80 mol % being methyl.

Silicone Resin B

A 6,000 g batch was prepared by mixing 9,020.96 g of methyltrimethoxysilane, and 333.3 g methanol. The mixture was hydrolyzed using 4.5 g trifluoromethanesulfonic acid (TFMSA) and 1,193.3 g deionized water, while heating the mixture to reflux temperature (68-70° C.) for 10 hours. The catalyst was then neutralized using 18.0 g $CaCO_3$. The alcohol by-product(s) and residual solvent were removed by distillation, and the resulting composition filtered. The final alkylfunctional silicone resin composition was analyzed and contained; 100.0mol % $RSiO_{3/2}$, 34.2 wt % SiOZ.

Silicone Resin C

A 6,000 g batch was prepared by mixing 6,683.3 g of methyltrimethoxysilane, 1605.1 g of octamethylcyclotetrasiloxane, 399.0 g of n-octyltriethoxysilane, and 333.3 g methanol. The mixture was hydrolyzed using 3.5 g trifluoromethanesulfonic acid (TFMSA) and 1,040.1 g deionized water, while heating the mixture to reflux temperature (68-70° C.) for 10 hours. The catalyst was then neutralized using 13.4 g $CaCO_3$. The alcohol by-product(s) and residual solvent were removed by distillation, and the resulting composition filtered. The final alkylfunctional silicone resin composition was analyzed and contained; 30.0 mol % $Me_2SiO_{2/2}$, 70.0 mol % $RSiO_{3/2}$, 18.1 wt % SiOZ.

Examples 1-3

A 12 kg of emulsion E1 was made according to the following. 50 parts of silicone resin A were mixed with 30 parts of a 10% aqueous solution of a polyvinylalcohol of 92% degree of hydrolysis and a molecular weight of 175,000 and 20 parts of water till homogeneous. The content was then passed through a 2-inch pipeline Greerco™ mixer (Chemineer Corp) at 4500 rpm with a back pressure of 20 psi and a pump speed of 40 Hz once. The resultant emulsion (E1) was homogeneous and milky white.

Part of emulsion E1 was added with 0.1% sodium bicarbonate based on the weight of the emulsion and mixed to arrive at emulsion E2.

Part of emulsion E2 was then added with 0.45% additional sodium bicarbonate and 0.25% sodium carbonate based on the weight of the emulsion and mixed to produce emulsion E3.

Particle size of the emulsions was measured using a Mastersizer™ 2000 by Malvern Instruments in the volume mode. Particle size distribution was found to be monomodal for all three emulsions. Diameters at 50% (Dv(0.5)) and 90% Dv(0.9)) populations are reported.

Emulsion E1, E2 and E3 was each poured into a polystyrene petri-dish and dried in air at ambient. Next day observations were made of the films.

$^{29}Si$ NMR measurements of the resin composition in the emulsion were made with $D_2O$ diluted emulsions of E1 immediately after made and of E3 after storing it at 50° C. in a closed vial for two weeks. Methanol level in the emulsion was measured by GC of emulsion E2 after storing at ambient for one month and of E3 after storing at 50° C. for two weeks.

Particles size, film characteristics, pH of the emulsion, resin composition and methanol level are summarized in Table 1. E1, E2 and E3 were stable at ambient conditions for months against observable settling or phase separation.

Examples 4-12

A 500 grams of emulsion was made according to the following. 50 parts of a silicone resin B was mixed with 40 parts of a 10% aqueous solution of the same PVA as in Example 1 and 10 parts of water till homogeneous. The mixture was then sheared using a Ultra-Turrax® by IKA® at 24,000 RPM for 4 cycles of 30 seconds each while tumbling the mixture in between cycles. The resultant emulsion (E4) is homogeneous and milky white.

Emulsion E4 was subdivided into portions of 25 g each and the portions were added with different type of salts. The various portions (E4-E12) were poured into polystyrene petri-dishes and dried in air at ambient. Next day observations were made of the films and are summarized in Table 2.

Example 13

In a stainless steel beaker was mixed 400 grams of the silicone resin C and 150 grams of a hydroxyl terminated polydimethylsiloxane of a viscosity of 50,000 cP. To the mixture was added 330 grams of a 10% aqueous solution of the same PVA as in Example 1 and 100 grams of water and mixed till homogeneous. The mixture was then sheared using an Ultra-Turrax® by IKA® at 24,000 RPM for 4 cycles of 30 seconds each while tumbling the mixture in between cycles. 20 grams of a 10% aqueous solution of sodium carbonate was then added to the mixture and mixed till homogeneous. The resultant emulsion (E13) was homogeneous and milky white. Finally, 3 grams of emulsion E13 was placed in a polystyrene petri-dish and dried in air at ambient condition for 24 hrs resulting in a tack-free, non-greasy film.

TABLE 1

| | Film Characterization | pH | Dv (0.5) | Dv (0.9) | Resin structure measured in emulsion | MeOH level in emulsion |
|---|---|---|---|---|---|---|
| Resin of E1 before emulsification | — | — | — | — | $R_{1.158}Si(OZ)_{0.519}O_{1.162}$ where R is 98.3 mol % methyl and 1.7 mol % octyl | — |

TABLE 1-continued

| | Film Characterization | pH | Dv (0.5) | Dv (0.9) | Resin structure measured in emulsion | MeOH level in emulsion |
|---|---|---|---|---|---|---|
| E1 (immediately after preparing) | Grease on top and bottom of film | 6.0 | 1.38 μm | 4.30 μm | $R_{1.159}Si(OZ)_{0.498}O_{1.172}$ where R is 98.3 mol % methyl and 1.7 mol % octyl | Not measured |
| E2 (immediately after preparing) | Grease-free, tack-free, adhering to Petri-dish | 8.1 | 1.24 μm | 4.05 μm | Not measured | 0.7 wt % |
| E3 (after stored at 50° C. for 2 weeks) | Grease-free, tack-free, adhering to Petri-dish | 9.6 | 1.13 μm | 3.72 μm | $R_{1.162}Si(OZ)_{0.482}O_{1.178}$ where R is 98.3 mol % methyl and 1.7 mol % octyl | 1.5 wt % |

TABLE 2

| Salt added to 25 g of E4 | E4 | E5 | E6 | E7 | E8 | E9 | E10 | E11 | E12 |
|---|---|---|---|---|---|---|---|---|---|
| NaCl, 10% soln | | 3 g | | | | | | | |
| NaHCO3, 2% soln | | | 5 g | | | | | | |
| Na2CO3, 2% soln | | | | 2.5 g | | | | | |
| NaOH, 1% soln | | | | | 0.15 g | | | | |
| Titanium(IV) bis(ammonium lactato)dihydroxide, 50% soln | | | | | | 0.0125 g | | | |
| Triethanolamine, 85% soln | | | | | | | 0.18 g | | |
| ZnSO4, 2% soln | | | | | | | | 5 g | |
| HCl, 10% soln | | | | | | | | | 0.12 g |
| pH of Emulsion | 5.4 | 5.95 | 7.93 | 10.6 | 8.38 | 6.26 | 8.75 | 5.15 | 4.06 |
| Film Characteristics | Partially cured, wet, not adhering to substrate | Partially cured, wet, not adhering to substrate | Fully cured, dry, tack-free | Fully cured, dry, tack-free | Fully cured, dry, tack-free | Partially cured, wet, not adhering to substrate | Fully cured, dry, tack-free | Mostly cured; greesy feel | Fully cured, dry, tack-free |

The invention claimed is:

1. An aqueous emulsion comprising;
   A) 1-70 weight percent of a silicone resin comprising a formula $[(CH_3)_2SiO_{2/2}]_d[(CH_3)SiO_{3/2}]_e[(C_8H_{17})SiO_{3/2}]_f$ wherein d may vary from 0.1 to 0.3,
   e may vary from 0.7 to 0.9,
   f may vary from 0.01 to 0.04
   and having a viscosity of from 1 to 4000 mPa·s at 25° C,
   B) 0- 40 weight percent of a hydroxy terminated polydiorganosiloxane,
   C) 0.5-20% based on the weight components A) and B) of a polyvinyl alcohol emulsifier,
   D) 0.001-5% based on the weight of the emulsion of a water soluble salt, wherein the emulsion provides a solid coating upon removing water from a film of the emulsion.

2. The emulsion of claim 1 wherein the emulsion composition is free of organosilanes and has a pH of 7 to 11.

3. The emulsion of claim 1 wherein B) the hydroxy terminated polydiorganosiloxane is present and is selected from a hydroxy terminated polydimethylsiloxane.

4. The emulsion of claim 1 wherein D) the water soluble salt is an alkali metal, alkaline earth metal or ammonium salt.

5. The emulsion of claim 1 wherein D) the water soluble salt is sodium hydrogen carbonate or sodium carbonate.

6. A method for preparing a solid coating comprising;
   I) forming a film of the emulsion composition according to claim 1 on a surface,
   II) removing water from the film to form the solid coating.

7. The solid coating prepared according to the method of claim 6.

8. A coating composition comprising the emulsion composition of claim 1.

* * * * *